United States Patent [19]

Isogai

[11] Patent Number: 4,979,592
[45] Date of Patent: Dec. 25, 1990

[54] DEVICE FOR RAISING AND LOWERING A STEP IN A TRANSFER LIFT

[75] Inventor: Shunji Isogai, Hekinan, Japan
[73] Assignee: Sugiyaso Industries Co., Ltd., Takahama, Japan
[21] Appl. No.: 365,537
[22] Filed: Jun. 13, 1989
[30] Foreign Application Priority Data Sep. 7, 1988 [JP] Japan .................. 63-117532[U]

[51] Int. Cl.⁵ .................................... B60S 13/00
[52] U.S. Cl. .......................... 187/8.72; 187/18; 187/8.65; 254/122
[58] Field of Search .............. 187/18, 9 R, 8.71, 8.72, 187/8.41, 8.65; 182/141; 254/122, 2 B, 2 R

[56] References Cited
U.S. PATENT DOCUMENTS 3,991,857 11/1976 Wolk et al. .................. 254/122
4,701,097 10/1987 Sturtz ........................ 187/18

Primary Examiner—H. Grant Skaggs
Assistant Examiner—Kenneth Noland
Attorney, Agent, or Firm—Lahive & Cockfield

[57] ABSTRACT

A device for raising and lowering a transfer step provided at one end of a vertically movable table in a lift includes a lug projecting from the step and an axially movable rod extending along the table and having one end linked to the lug. The rod has a laterally projecting pin near the other end thereof located remotely from the step. A handlebar is rotatably supported near the other end of the rod. A pin driving member is connected to the handlebar rotatably therewith and has a slot in which the pin is slidably fitted. The slot extends radially of the axis of rotation of the pin driving member. When the handlebar is rotated to rotate the pin driving member, the pin slides along the slot to cause the axial movement of the rod to rotate the step from one of its raised and lowered positions to the other. The slot includes a laterally projecting portion forming an arcuate contour having its center at the axis of rotation of the pin driving member, so that the pin may be held in the laterally projecting portion of the slot when the step stays in its raised position.

8 Claims, 8 Drawing Sheets

DEVICE FOR RAISING AND LOWERING A STEP IN A TRANSFER LIFT

BACKGROUND OF THE INVENTION

1. Field of the Invention

This invention relates to a device for raising and lowering a step provided at one end of a vertically movable table in a transfer lift rotatably between its substantially vertical position and its substantially horizontal position in which it forms an extension of the table when the lift is used for transferring a container, bogie, wheelchair, etc. from one place to another having a higher or lower level of height, as between a platform and the bed of a truck, or between a road or ground floor and a raised floor in a building.

2. Description of the Prior Art

There is known a transfer lift having a rotatable transfer step as hereinabove described. Reference is made to FIG. 9 showing a part of a typical known lift of the type to which this invention pertains. A post 26 is upstanding from the lift adjacent to the transfer step 23 and a handlebar 32 is rotatably attached to the post 26. A connecting rod 30 is rotatably connected between the step 23 and the handlebar 32. The step 23 can be raised or lowered if the handlebar 32 is raised or lowered, as shown by broken and solid lines in FIG. 9.

When the lift is used to transfer a container by way of example, the container is moved onto a table past the loading end of the lift, while the transfer step is kept in its raised position. The transfer step in its raised position serves as a stopper for preventing the container from moving past the unloading end of the lift at which the transfer step is located. The table is, for example, raised to an appropriate height and the transfer step is, then, lowered to permit the transfer of the container. However, as the handlebar is situated near the transfer step, i.e. near the unloading end of the lift, the operator of the lift who has caused the container to be received onto the table is required to go from its loading end to its unloading end to operate the handlebar. Moreover, when the container is moved onto the table, it is likely to force the transfer step into its lowered position and if the table is raised with the transfer step in its lowered position, there is every likelihood that the container may fall down.

SUMMARY OF THE INVENTION

Therefore, it is an object of this invention to provide a device which can be remotely operated to raise and lower a transfer step in a transfer lift, thereby eliminating the necessity for the operator to move on the lift to operate the step, and which can hold the step in its raised position.

This object is attained by a device which comprises a lug projecting from a transfer step provided at one end of a vertically movable lift table rotatably between its substantially horizontal lowered position and its substantially vertical raised position; an axially movable rod extending along the table and having one end linked to the lug, the rod being provided with a laterally projecting pin near the other end thereof located remotely from the step; a handlebar supported rotatably near the other end of the rod; and a pin driving member connected rotatably to the handlebar and having a slot in which the pin is slidably fitted, the handlebar and the pin driving member being rotatable about a common axis of rotation and the slot extending radially of the axis of rotation, so that when the handlebar is rotated to rotate the pin driving member, the pin may slide along the slot to cause the axial movement of the rod to rotate the step from one of its positions to the other, the slot including a laterally projecting portion forming an arcuate contour having its center at the axis of rotation of the pin driving member, so that the pin may be held in the laterally projecting portion of the slot when the step stays in its raised position.

As the handlebar is operationally connected to the transfer step by the rod extending substantially between the two opposite ends of the table, the step can be operated remotely by the operator staying at the loading end of the lift. As the slot and its laterally projecting portion are substantially perpendicular to each other, the operator holding the handlebar receives from it a reaction indicating that the pin has dropped into the laterally projecting portion of the slot, and the pin held therein keeps the step in its raised position, even if, for example, a container placed on the table may violently abut on the step. There is no longer any fear of the container falling down inadvertently.

According to a preferred aspect of this invention, the device further includes a limit switch so positioned as to be engaged by the rod which has been moved to rotate the step into its raised position, and so operationally associated with the table that the table may be raised only when the limit switch has been engaged by the rod.

Other features and advantages of this invention will become apparent from the following description and the accompanying drawings.

BRIEF DESCRIPTION OF THE DRAWINGS

FIG. 5(a') is a fragmentary enlargement of FIG. 5(a) showing the positions which a pin and a pin driving member take to keep the step in its lowered position;

FIG. 5(b') is a fragmentary enlargement of FIG. 5(b) showing the positions which the pin and the pin driving member take to keep the step in its raised position;

DETAILED DESCRIPTION OF THE INVENTION

Figure 1:
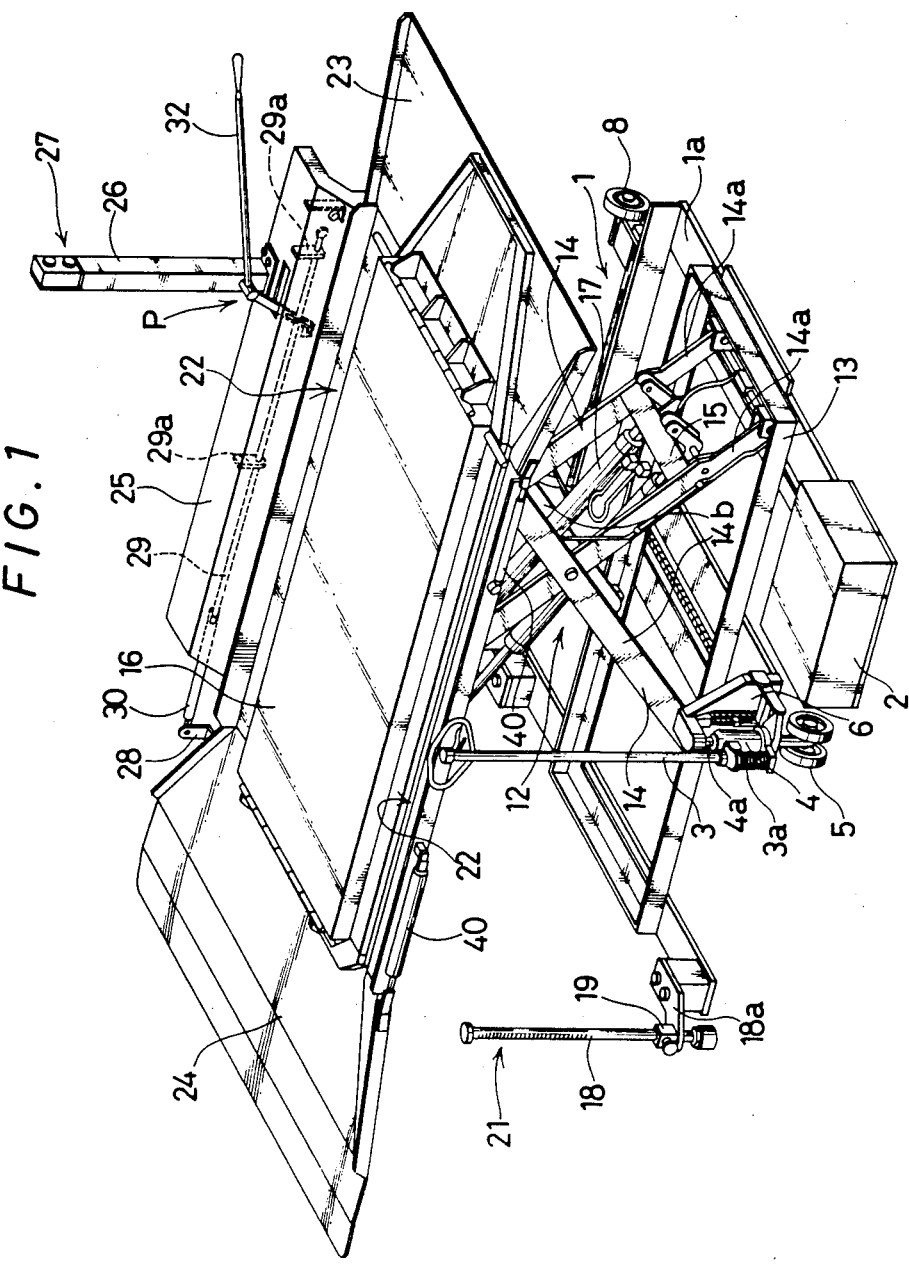
FIG. 1 is a perspective view of a container transfer lift including a device embodying this invention.
Figure 2:
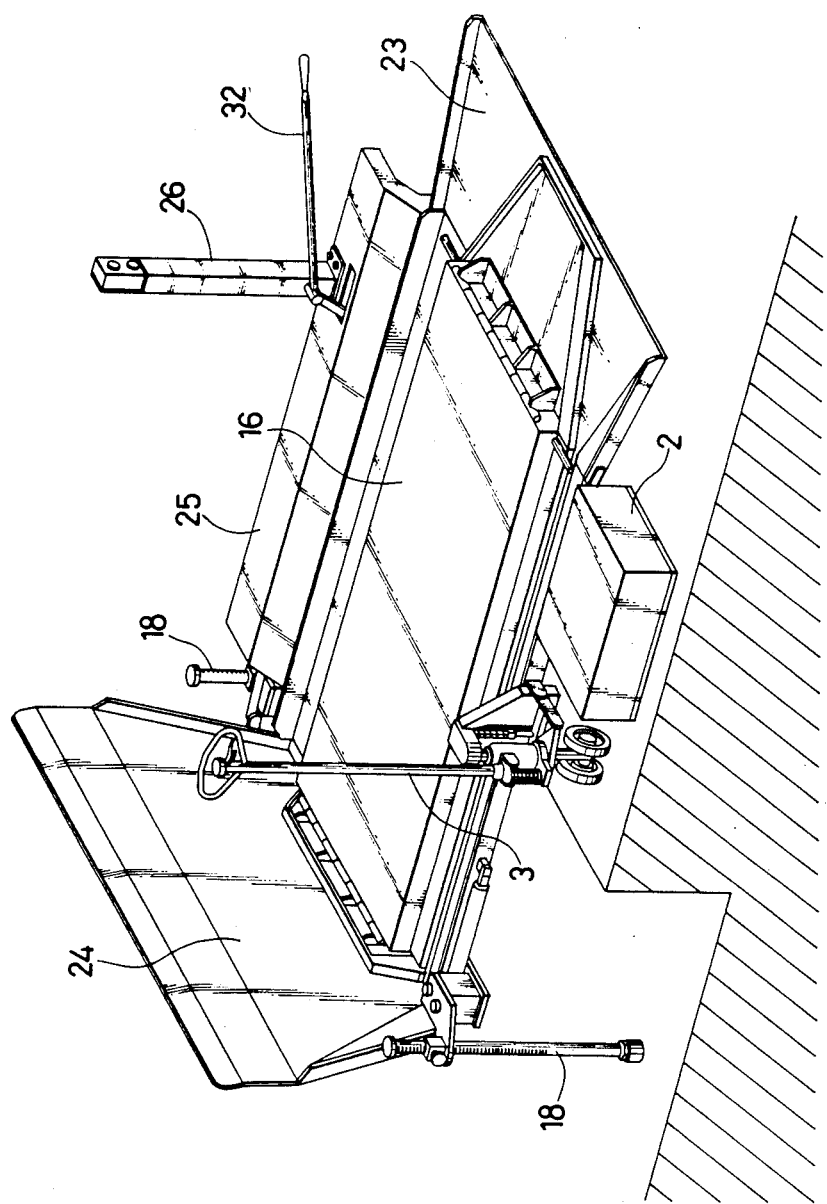
FIG. 2 is a perspective view of the lift with a table in its lowered position.
Figure 3:
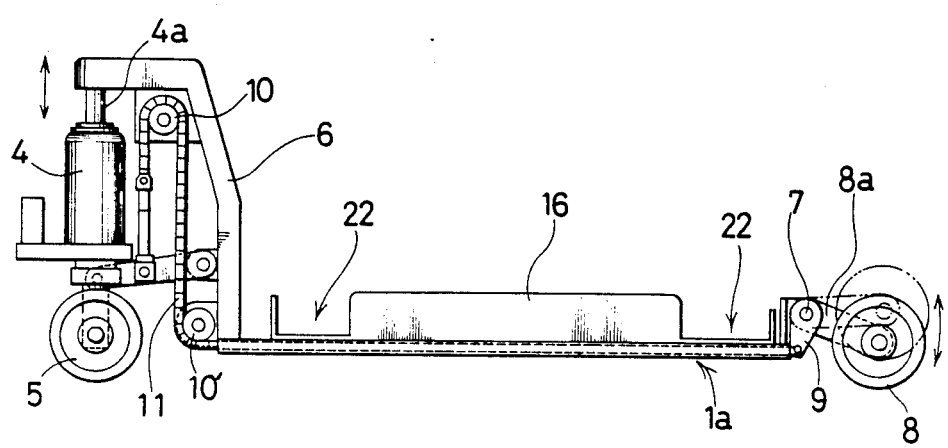
FIG. 3 is an elevational view of a mechanism for raising the base of the lift from a floor.

A container transfer lift including a device embodying this invention is shown by way of example in FIG. 1. The lift includes a wheeled body 1 having a base 1a formed as a rectangular frame. The base 1a is provided on one side thereof with a hydraulic unit 2, a pumping handlebar 3, a pump 3a and a cylinder 4. The handlebar 3, pump 3a, cylinder 4 and a pair of wheels 5 are horizontally rotatable together. The cylinder 4 includes a piston rod 4a connected to the base 1a by a connecting member 6, as shown in FIG. 3. The base 1a is provided on the opposite side thereof from the wheels 5 with a shaft 7 supported rotatably at both ends thereof. A pair of front wheels 8 are supported on a pair of brackets 8a, respectively, which are fixed to the shaft 7 at the opposite ends thereof, respectively, as shown in FIG. 3. An arm 9 projects from the shaft 7 at right angles thereto. A chain 11 having one end fastened to a support for the pump 3a extends about a pair of vertically spaced apart chain wheels 10 and 10' supported on the connecting member 6 and across the base 1a, and the other end of the chain 11 is connected to the arm 9, as shown in FIG. 3. If the handlebar 3 is rotated horizontally about its own axis, the direction in which the wheels 5 face is changed. If the handlebar 3 is rotated in a vertical plane to raise the piston rod 4a, the base 1a is raised along one side thereof and the chain 11 is also raised about the chain wheel 10 to pull the arm 9 and thereby rotate the front wheels 8 down about the shaft 7, whereby the base 1a as a whole is horizontally raised above a floor, thereby enabling the wheeled body 1 to move. If the piston rod 4a is lowered, the base 1a rests on the floor again.

A jack assembly 12 is supported on the wheeled body 1, as shown in FIG. 1. The jack assembly 12 comprises a base frame 13 supported on the base 1a and two X-shaped link combinations 14 supported on the base frame 13. The base frame 13 has a portion projecting horizontally beyond the base 1a. Each X-shaped link combination 14 comprises a first link 14a having a lower end supported rotatably at one end of the base frame 13 and a second link 14b having a lower end supported slidably on the base frame 13. The second link 14b of one of the link combinations 14 is slidable along one of two opposite edges of the base frame 13, while the second link 14b of the other link combination 14 is slidable along the other edge thereof. The first links 14a are connected to each other by a connecting member 15 situated between their lower ends and their junctions to the second links 14b.

A table 16 is supported on the jack assembly 12. The jack assembly 12 is provided with a pair of parallel hydraulic cylinders 17. Each hydraulic cylinder 17 has a base end supported rotatably on the connecting member 15 and includes a piston rod having an outer end supported rotatably on the underside of the table 16. The hydraulic cylinders 17 are operable by the hydraulic unit 2 for raising and lowering the table 16.

Figure 4:
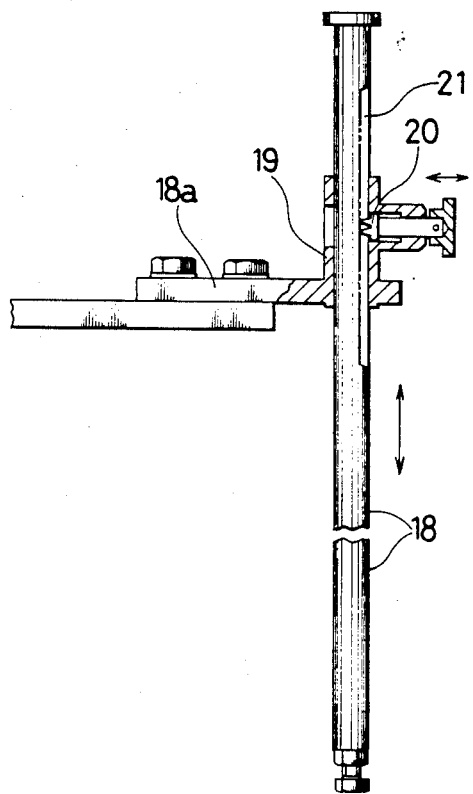
FIG. 4 is an elevational view of a supporting leg.

The frame 13 is provided with a pair of arms 18a projecting outwardly from two corners of its portion projecting from the base 1a, respectively. A pair of supporting legs 18 are vertically slidably supported by the arms 18a, respectively. Each arm 18a includes a portion defining a leg holder 19 provided with a holding pin 20 and one of the legs 18 extends through the leg holder 19, as shown in FIG. 4. The leg 18 has a surface portion formed with a rack 21 with which the pin 20 is engageable to hold the leg 18 at a desired level of height.

The table 16 is provided with a pair of wheel receiving grooves 22 along its longitudinal edges, respectively. A loading step 23 and an unloading or transfer step 24 are provided rotatably at the transverse edges, respectively, of the table 16. Each of the steps 23 and 24 is rotatable between its substantially horizontal lowered position in which it forms an extension of the table 16, and its substantially vertical raised position. The table 16 is also provided with an operator's footplate 25 along and outwardly of one of the grooves 22. A post 26 is upstanding from the footplate 25 near the loading step 23 and is provided with a button switch 27 for operating the jack assembly 12.

Figure 5A:
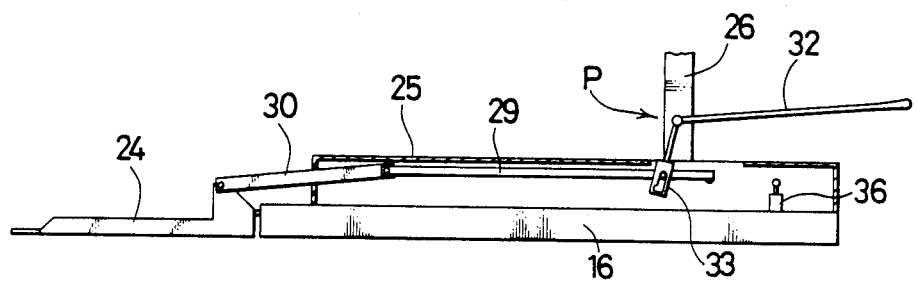
FIG. 5(a) is an elevational view of the device showing a transfer step in its lowered position.
Figure 5B:
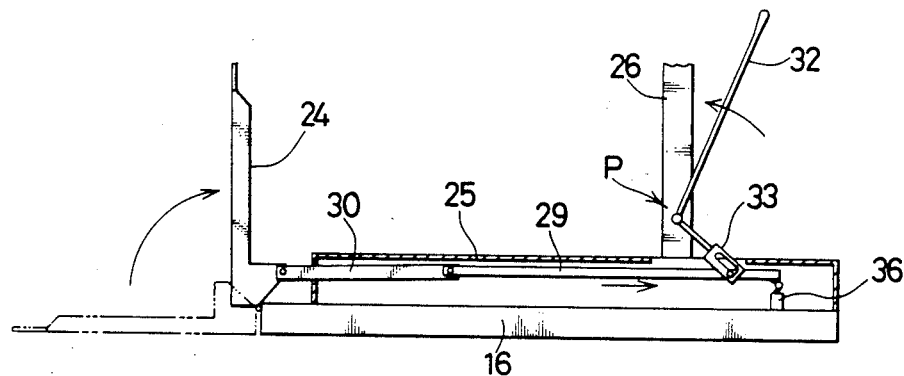
FIG. 5(b) is an elevational view of the device showing the step in its raised position.
Figure 5B:
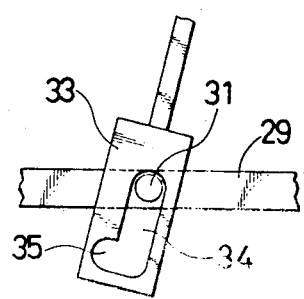
Figure 5B:
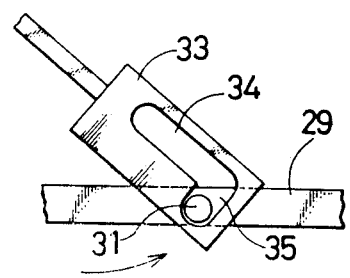

A lug 28 projects from one edge of the transfer step 24 near the footplate 25. The lug 28 lies in an upwardly directed position when the step 24 stays in its lowered position, as shown in FIG. 1. An axially movable rod 29 is slidably supported by two guide members 29a under the footplate 25 and extends substantially horizontally along the table 16. The rod 29 has one end located near the lug 28 and linked by a connecting rod 30 to the upper end of the lug 28 in its upwardly directed position, while the other end of the rod 29 is located near the post 26. A pin 31 projects from the rod 29 horizontally at right angles thereto near the other end thereof, as shown in FIGS. 5(a) and 5(b). A fulcrum-forming member P projects horizontally from one vertical face of the post 26. A handlebar 32 is rotatably supported on the fulcrum-forming member P. The handlebar 32 is bent at the fulcrum-forming member P and has an extension situated below it. The extension has a lower end provided with a pin driving member 33.

The pin driving member 33 has a substantially L-shaped slot 34 (or more exactly, shaped like the mirror image of the letter L), as shown in FIGS. 5(a) and 5(b), or as better shown in FIGS. 5(a') and 5(b'). The slot 34 extends in parallel to the line on which the extension of the handlebar 32 lies, or radially with respect to the fulcrum-forming member P. The slot 34 includes, or terminates in, a laterally projecting portion 35 lying substantially arcuately relative to the fulcrum-forming member P. The pin 31 is fitted in the slot 34 slidably from it to its laterally projecting portion 35, or vice versa, upon rotation of the handlebar 32 which in turn causes the rotation of the pin driving member 33 about the fulcrum-forming member P, too. If the handlebar 32 is lowered, the pin driving member 33 is moved toward the transfer step 24 with the pin 31 sliding from the slot portion 35 to the slot 34 and causes the rod 29 to advance to rotate the step 24 into its lowered position, as shown in FIG. 5(a). If the handlebar 32 is raised, the pin driving member 33 is moved away from the step 24 with the pin 31 sliding from the slot 34 to its laterally projecting portion 35 and causes the rod 29 to retract to rotate the step 24 into its raised position, as shown in FIG. 5(b). When the step 24 stays in its raised position, the pin 31 always stays in the laterally projecting slot portion 35 and the pin driving member 33 holds the rod 29 against axial movement to thereby keep the step 24 in its raised position, unless the handlebar 32 is lowered.

A limit switch 36 is provided under the footplate 25 adjacent to that end thereof which is remote from the lug 28. The limit switch 36 is so positioned relative to the rod 29 that the rod 29 may stay away from the limit switch 36 as long as the step 24 stays in its lowered position as shown in FIG. 5(a), or in any intermediate position, and that only when the rod 29 has been moved to rotate the step 24 into its completely raised position, it may engage the limit switch 36 and turn it on, as shown in FIG. 5(b). The limit switch 36 is operationally associated with the jack assembly 12, so that the table 16 can be raised only when the step 24 is in its raised position.

Figure 6:
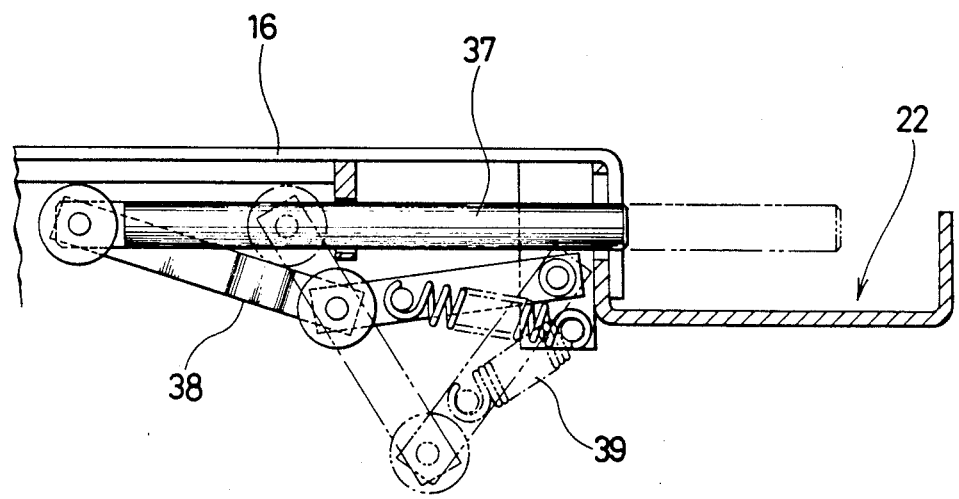
FIG. 6 is a fragmentary enlargement of FIG. 1 showing a wheel stopper which can be moved into, or retracted from, a wheel receiving groove.

The table 16 is provided adjacent to the loading step 23 with a pair of wheel stopper mechanisms which brake the wheels of the container placed on the table 16 to prevent it from falling down past the step 23 when the table 16 is raised, or stays in its raised position. Each wheel stopper mechanism comprises a rod 37 lying horizontally at right angles to one of the wheel receiving grooves 22 and having one end facing it, a deformable link assembly 38 having one end connected rotatably to the other end of the rod 37, while the other end thereof is rotatably secured to the table 16, and a coil spring 39 having one end fastened to the link assembly 38, while the other end thereof is fastened to the table 16, as shown in FIG. 6. When the table 16 stays in its lowermost position in which the link assembly 38 rests on the base 1a, the link assembly 38 stays in its expanded form by overcoming the contracting force of the spring 39 and keeps the rod 37 in its retracted position, as shown by solid lines in FIG. 6. When the table 16 is raised, however, the spring 39 contracts and deforms the link assembly 38 into a generally V-shaped contracted form to thereby cause the rod 37 to advance into the groove 22, as shown by broken lines in FIG. 6. The rods 22 prevent the wheels of the container on the table 16 from moving out of the grooves 22 when the table 16 is raised.

A gas spring 40 is connected between the table 16 and the loading step 23 to facilitate the rotation of the step 23 by one hand. Another gas spring 40 is connected between the table 16 and the transfer step 24 to facilitate the remote operation of the step 24 by the handlebar 32.

Figure 7A:
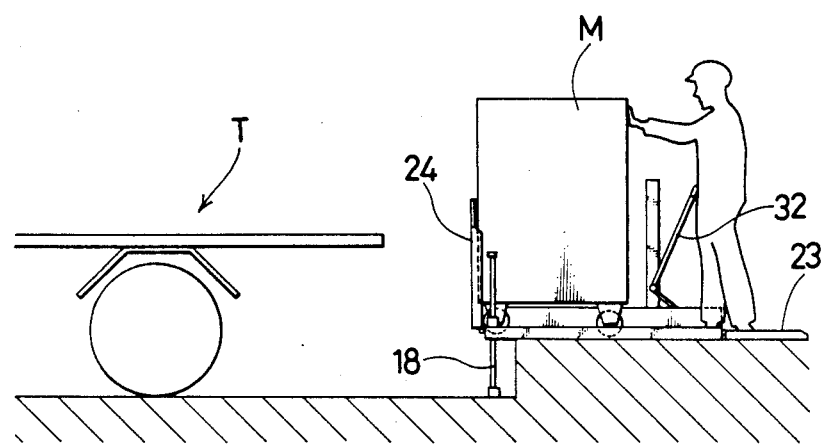
FIGS. 7(a) and 7(b) are a set of schematic elevational views showing a transfer job by the lift.
Figure 7B:
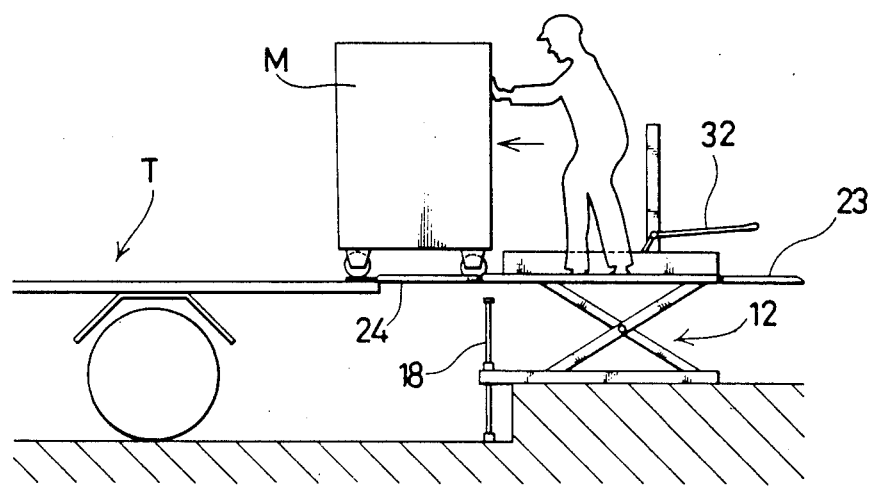

Attention is now directed to FIGS. 7(a) and 7(b) showing by way of example the mode in which the lift as hereinabove described is used for a transfer job. The lift which has been brought to a platform is so positioned that the table 16 may project beyond the edge of the platform, while the transfer step 24 lies over a pit. The base 1a is lowered to rest on the platform and the supporting legs 18 are lowered to the bottom of the pit. The table 16 is lowered to its lowermost position and the handlebar 32 is raised to raise the transfer step 24. A container M having wheels is received past the loading step 23 and positioned on the table 16, as shown in FIG. 7(a). Then, the table 16 is raised. When it has been raised to a level which is substantially equal to the level of the bed of a truck T, the handlebar 32 is lowered to lower the transfer step 24 to form a bridge between the table 16 and the bed of the truck T and the container M is moved across the step 24 onto the bed of the truck T, as shown in FIG. 7(b).

Figure 8A:
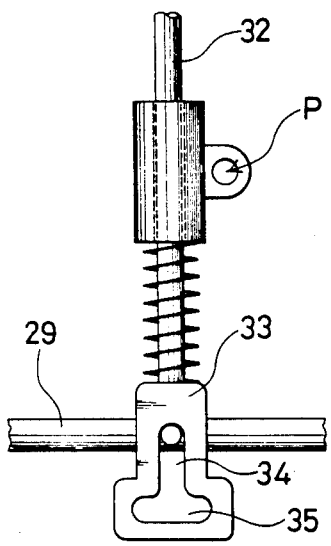
FIGS. 8(a) to 8(c) are a set of elevational views showing a modified form of pin driving member.
Figure 8B:
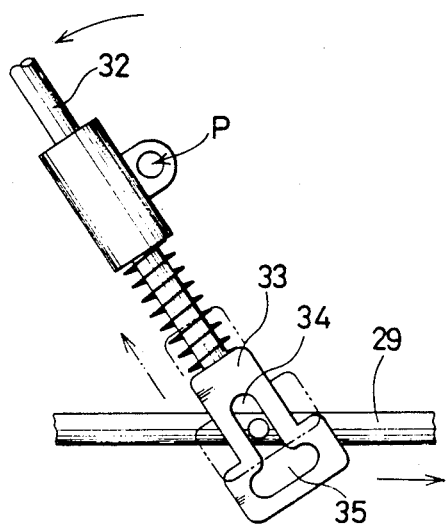
Figure 8C:
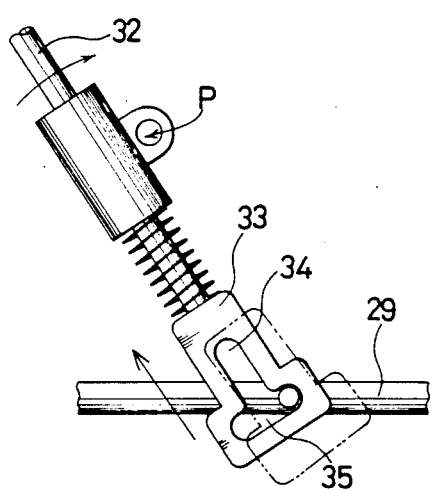
Figure 9:
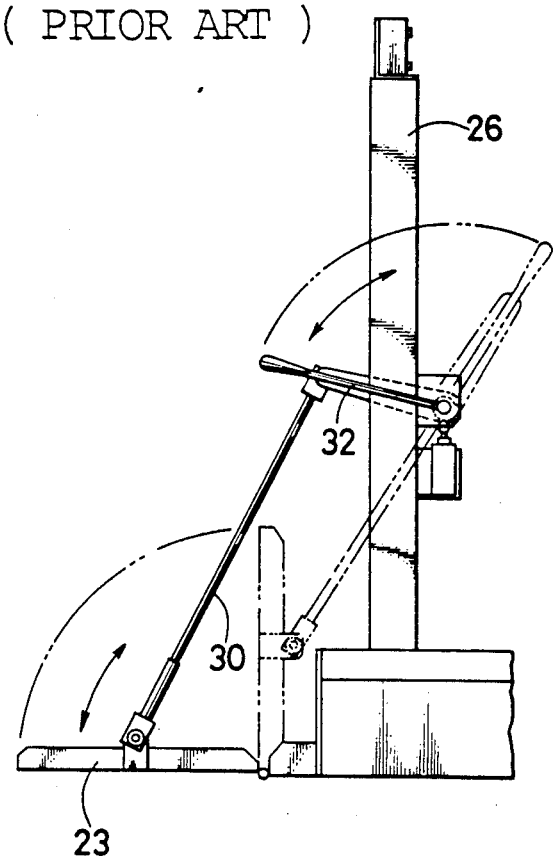
FIG. 9 is an elevational view of the known device.

Reference is now made to FIGS. 8(a) to 8(c) showing a modified combination of a handlebar 32, a pin driving member 33 and a fulcrum-forming member P. The handlebar 32 is not only rotatable about the fulcrum-forming member P attached to the post, but is also slidable through it. A spring is provided between the pin driving member 33 and the fulcrum-forming member P for urging down the pin driving member 33. The pin driving member 33 has a T-shaped slot 34 which includes a bilaterally projecting portion 35 at its lower end. When the pin projecting from the axially movable rod 29 stays at the upper end of the slot 34 as shown in FIG. 8(a), the transfer step is held in its lowered position. If the handlebar 32 is rotated to raise the transfer step, however, the pin approaches the bilaterally projecting portion 35 of the slot 34, and if the handlebar 32 is pulled up by overcoming the force of the spring and turned in either direction, the pin is locked in the bilaterally projecting portion 35, as shown in FIG. 8(c). This modified arrangement assures the operator that he has certainly caused the pin to be locked to hold the transfer step in its raised position, since he takes the positive action of pulling up the handlebar to do so.

While the invention has been described with reference to the preferred embodiments thereof, it is to be understood that modifications or variations may be easily made by anybody of ordinary skill in the art without departing from the scope of this invention which is defined by the appended claims.

What is claimed is:

1. A device for raising and lowering a transfer step provided at one end of a vertically movable table in a lift, said step being rotatable between its substantially horizontal lowered position and its substantially vertical raised position, said device comprising:
    a lug projecting from said step;
    an axially movable rod extending along said table and having one end linked to said lug, said rod being provided with a laterally projecting pin near the other end thereof located remotely from said step;
    a handlebar supported rotatably near said other end of said rod; and
    a pin driving member connected to said handlebar rotatably therewith and having a slot in which said laterally projecting pin is slidably fitted, said slot extending radially of the axis of rotation of said pin driving member, so that when said handlebar is rotated to rotate said pin driving member, said laterally projecting pin may slide along said slot to cause the axial movement of said rod to rotate said step from one of said positions thereof to the other, said slot including a laterally projecting portion forming an arcuate contour having its center at said axis of rotation, so that said laterally projecting pin may be held in said laterally projecting portion when said step stays in said raised position thereof.

2. A device set forth further including a limit switch which is engageable by said rod when said rod has been moved to rotate said step into said raised position thereof, said limit switch being operationally associated with said table, so that said table may be raised only when said limit switch has been engaged by said rod.

3. A device as set forth in claim 2, wherein said slot is generally L-shaped.

4. A device as set forth in claim 2, wherein said laterally projecting portion projects bilaterally from said slot and said slot is, therefore, generally T-shaped.

5. A device as set forth in claim 4, further including a spring which urges said pin driving member to stay in its position where said laterally projecting pin is held in said slot outside said laterally projecting portion thereof, while said pin driving member can be moved by overcoming the force of said spring to hold said laterally projecting pin in said laterally projecting portion.

6. A device as set forth in claim 1, wherein said slot is generally L-shaped.

7. A device as set forth in claim 1, wherein said laterally projecting portion projects bilaterally from said slot and said slot is, therefore, generally T-shaped.

8. A device as set forth in claim 7, further including a spring which urges said pin driving member to stay in its position where said laterally projecting pin is held in said slot outside said laterally projecting portion thereof, while said pin driving member can be moved by overcoming the force of said spring to hold said laterally projecting pin in said laterally projecting portion.

* * * * *